(12) United States Patent
Hazan et al.

(10) Patent No.: US 9,469,029 B2
(45) Date of Patent: Oct. 18, 2016

(54) METHOD AND APPARATUS FOR SAVING ENERGY AND REDUCING CYCLE TIME BY OPTIMAL ORDERING OF THE INDUSTRIAL ROBOTIC PATH

(71) Applicant: Siemens Industry Software Ltd., Airport (IL)

(72) Inventors: Moshe Hazan, Elad (IL); Lisandro Embon, Petah Tikva (IL); Rahav Madvil, Rishon Lezion (IL)

(73) Assignee: Siemens Industry Software Ltd., Airport (IL)

( * ) Notice: Subject to any disclaimer, the term of this patent is extended or adjusted under 35 U.S.C. 154(b) by 77 days.

(21) Appl. No.: 14/447,964

(22) Filed: Jul. 31, 2014

(65) Prior Publication Data
US 2016/0031082 A1 Feb. 4, 2016

(51) Int. Cl.
*B25J 9/18* (2006.01)
*B25J 9/16* (2006.01)

(52) U.S. Cl.
CPC .............. *B25J 9/1664* (2013.01); *B25J 9/1661* (2013.01); *G05B 2219/39361* (2013.01); *G05B 2219/40102* (2013.01); *G05B 2219/40112* (2013.01); *G05B 2219/40446* (2013.01); *G05B 2219/40463* (2013.01); *G05B 2219/40465* (2013.01); *G05B 2219/40518* (2013.01); *G05B 2219/40523* (2013.01); *Y02P 80/10* (2015.11)

(58) Field of Classification Search
CPC .... B25J 9/1656; B25J 9/1664; B25J 9/1671; G05B 2219/40518; G05B 2219/40519; G05B 2219/40523; G05B 2219/39357; G05B 2219/39358; G05B 2219/39361; G05B 2219/39364; G05B 2219/40512; G05B 2219/40449; G05B 2219/40463; G05B 2219/40465
See application file for complete search history.

(56) References Cited

U.S. PATENT DOCUMENTS

| | | | |
|---|---|---|---|
| 5,784,542 A | 7/1998 | Ohm et al. |
| 6,004,016 A | 12/1999 | Spector |
| 6,216,058 B1 | 4/2001 | Hosek et al. |
| 6,493,607 B1 | 12/2002 | Bourne et al. |

(Continued)

FOREIGN PATENT DOCUMENTS

| | | |
|---|---|---|
| DE | 102008027475 A1 | 12/2009 |
| DE | 102010052253 A1 | 5/2012 |

(Continued)

OTHER PUBLICATIONS

Ahuactzin, J., et al., "Using Genetic Algorithms for Robot Motion Planning," Proceedings of the 10th European Conference on Artificial Intelligence, 1992, 5 pages.

(Continued)

*Primary Examiner* — Spencer Patton (57) ABSTRACT

Methods for saving energy and reducing cycle time by using optimal ordering of the industrial robotic path. A method includes receiving inputs including a complex operation, generating a plurality of task groups of the complex operation, calculating a group edge rating for each of a plurality of robotic movement edges between each of the plurality of task groups, calculating a candidate rating for each of a plurality of candidate paths, wherein the candidate rating comprises a summation of the group edge ratings for a candidate path, determining an optimal path comprising the candidate path with an optimal rating, wherein the optimal rating is determined by the lowest candidate rating, and returning the optimal path.

20 Claims, 8 Drawing Sheets

(56) References Cited

U.S. PATENT DOCUMENTS

| | | | |
|---|---|---|---|
| 6,728,599 | B2 | 4/2004 | Wang et al. |
| 7,298,385 | B2 | 11/2007 | Kazi et al. |
| 7,386,365 | B2 | 6/2008 | Nixon |
| 8,401,698 | B2 | 3/2013 | Kamrani et al. |
| 8,620,473 | B2 | 12/2013 | Diolaiti et al. |
| 2004/0111183 | A1 | 6/2004 | Sutherland et al. |
| 2005/0055132 | A1 | 3/2005 | Matsumoto et al. |
| 2005/0137648 | A1 | 6/2005 | Cosendai et al. |
| 2005/0197680 | A1 | 9/2005 | DelMain et al. |
| 2006/0025890 | A1 | 2/2006 | Nagatsuka et al. |
| 2006/0145647 | A1 | 7/2006 | Kitatsuji et al. |
| 2006/0217841 | A1 | 9/2006 | Matsumoto et al. |
| 2006/0287769 | A1 | 12/2006 | Yanagita et al. |
| 2008/0009971 | A1 | 1/2008 | Kim et al. |
| 2008/0306628 | A1 | 12/2008 | Ng-Thow-Hing et al. |
| 2009/0105880 | A1 | 4/2009 | Okazaki |
| 2010/0224022 | A1 | 9/2010 | Choi et al. |
| 2010/0305751 | A1 | 12/2010 | Nagatsuka |
| 2011/0153080 | A1 | 6/2011 | Shapiro et al. |
| 2012/0158174 | A1 | 6/2012 | Moon et al. |
| 2012/0165982 | A1 | 6/2012 | Kim et al. |
| 2012/0290131 | A1* | 11/2012 | Khoukhi ............... B25J 9/1623 700/250 |
| 2013/0030569 | A1 | 1/2013 | Fudaba et al. |
| 2014/0005804 | A1 | 1/2014 | Brand |
| 2014/0156068 | A1 | 6/2014 | Graca et al. |
| 2014/0163736 | A1 | 6/2014 | Azizian et al. |
| 2014/0207837 | A1 | 7/2014 | Taniguchi et al. |
| 2015/0148952 | A1 | 5/2015 | Shiratsuchi |
| 2015/0177194 | A1 | 6/2015 | Xu et al. |

FOREIGN PATENT DOCUMENTS

| | | |
|---|---|---|
| EP | 1090723 A2 | 4/2001 |
| EP | 2157490 A1 | 2/2010 |
| EP | 2485875 B1 | 4/2013 |
| JP | 2004243461 A | 9/2004 |
| JP | 2006192554 A | 7/2006 |
| WO | 2005049284 A1 | 6/2005 |
| WO | 2005124486 A2 | 12/2005 |
| WO | 2011042293 A1 | 4/2011 |
| WO | 2014052286 A1 | 4/2014 |

OTHER PUBLICATIONS

Bohlin, R., et al., "Path Planning Using Lazy PRM," Proceedings of the 2000 IEEE International Conference on Robotics and Automation, San Francisco, CA, USA Apr. 2000, pp. 521-528.

Chen, P., et al. "SANDROS: A Motion Planner with Performance Proportional to Task Difficulty," Proceedings of the 1992 IEEE International Conference on Robotics and Automation, Nice, France, May 1992, 8 Pages.

Faverjon, B., et al., "The mixed Approach for Motion Planning: Learning Global Strategies from a Local Planner," Proceedings of the International Joint Conference on Artifical Intelligence, Jan. 1, 1987, 7 pages.

Gueta, L., et al., "Compact Design of Work Cell with Robot Arm and Positioning Table Under a Task Completion Time Constraint," 2009 IEEE/RSJ International Conference on Intelligent Robots and Systems, St. Louis, MS, USA, Oct. 11-15, 2009, 7 pages.

Gueta, L., et al., "Practical Point-to-Point Multiple-Goal Task Realization in a Robot Arm with a Rotating Table," Advanced Robotics, vol. 25, No. 6-7, 2011, pp. 717-738.

Hein, B., et al., Automated Generated Collision-Free Time Optimized Robot Movements in Industrial Environments Based on Rounding, Proceedings of the 4th IEEE International Symposium on Assembly and Task Planning, Furuoka, Japan, May 28-29, 2001, pp. 110-115.

Hirakawa, A., "Trajectory Generation for Redundant Manipulators Under Optimization of Consumed Electrical Energy," Conference Record of the 1996 IEEE Industry Applications Conference—31st IAS Annual Meeting, IEEE Service Center, US, vol. 6, Oct. 6, 1996, XP010201236.

Hwang, Y,. et al., "Optimizing Robot Placement for Visit-Point Tasks" Proceedings of the AI and Manufacturing Research Planning Workshop, Albuquerque, NM, USA, Jun. 1996, 7 pages.

Sanchez, G., et al, "Locally-Optimal Path Planning by Using Probablistic Roadmaps and Simulated Annealing," Proceedings of IASTED International Conference on Robotics and Applicatiions, Oct. 1999, 6 pages.

Skiena, S., "Weighted Graph Algorithm," The Algorithm Design Manual, 2nd Ed., Chapter 6, London, England, Aug. 2008, 39 pages.

Tian, L., et al., "An Effective Robot Trajectory Planning Method Using a Genetic Algorithm," Mechatronics, vol. 14, 2004, pp. 455-470.

Yue, S., et al., "Point-to-Point Trajectory Planning of Flexible Redundant Robot Manipulators Using Genetic Algorithms," to appeal in Robotica, Trajectory Planning of FRM, Jul. 17, 2001, pp. 1-24.

Foreign Communication From a Related Counterpart Application, PCT Application No. PCT/US2013/061340, International Search Report dated Jan. 31, 2014, 6 pages.

Foreign Communication From a Related Counterpart Application, PCT Application No. PCT/US2014/021801, International Search Report dated Sep. 3, 2014, 5 pages.

U.S. Appl. No. 14/448,416, Non-Final Office Action dated Aug. 25, 2015, 9 pages.

U.S. Appl. No. 14/197,620, Final Office Action dated Jul. 31, 2015, 16 pages.

Bernhardt, R., et al. "The Virtual Robot Controller (VRC) Interface." ISATA 2000, Automation & Transportation Technology Simulation and Virtual Reality. Dublin, Ireland, Sep. 25-27, 2000, 6 pages.

Bernhardt, R., et al. "Realistic Robot Simulation in Concurrent Engineering of Manufacturing Lines in Automotive Industries." Eighth ISPE Int'l Conference on Concurrent Engineering: Research and Applications, Jul. 29-Aug. 1, 2002, 5 pages.

Bernhardt, R., et al. "Virtual Robot Controller (VRC) Interface." Robotik. (2000) (7 pages). (No English translation available).

Willnow, C., et al. "Virtual Time Management of Virtual Robot Controllers." Modelling and Simulation 2001, 15th European Simulation Multiconference 2001, ESM' 2001, Jun. 6-9, 2001, Prague, Czech Republic, 8 pages.

Bernhardt, R., et al. "Virtual Robot Controllers as Simulation Agents." 2nd Workshop on Agent-Based Simulation. ISBN 1-56555-215-6. Apr. 2-4, 2001, Passau, Germany, 6 pages.

Bernhardt, R., et al. "Development of Virtual Robot Controllers and Future Trends." 6th IFAC Symposium on "Cost oriented Automation." Berlin, Germany, Oct. 8-9, 2001, 7 pages.

Bernhardt, R., et al. "Von realistischer roboter simulation zu virtuellen steuerungen." ZWF, Zeitschrift fur wirtschaftlichen Fabrikbetrieb, 2000, Munich, 5 pages. (No English translation available).

"Realistic Robot Simulation (RRS)." www.realistic-robot-simulation.org, Fraunhofer IPK. (2009) Retrieved Jul. 26, 2014, 4 pages.

Gasparetto et al. "Trajectory Planning in Robotics," Mathematics in Computer Science, vol. 6, No. 3, Aug. 30, 2012, pp. 269-279, XP035125437, 11 pages.

EP Search Report dated Jan. 14, 2016, for EP Application 15176747.2, 8 pages.

Cao, Bailin et al. "Practical Implementation of Time-efficient Trajectory Planning for Two Cooperative Industrial Robot Arms", Proceedings of the 1996 IEEE/RSJ International Conference on Robots and Systems (IROS). Robotic Intelligence Interacting with Synamic Worlds, Osaka, Nov. 4-8, 1996, XP000771580, ISBN: 978-0-7803-3214-0, 8 pages.

Wang, Fei-Yue et al "Planning Time-Optimal Trajectory for Coordinated Robot Arms", Proceedings of the International Conference on Robotics and Automation Atlanta, May 2-6, 1993, Los Alamitos, IEEE Comp. Soc. Press, US, vol. Conf. 10, May 2, 1993, XP010095120, ISBN; 978-0-8186-3450-5, 6 pages.

Baba N. et al: "Collision avoidance planning of a robot manipulator by using genetic algorithm—A consideration for the problem in which moving obstacles and/or several robots are included in the workspace"; Evolutionary computation, 1994; IEEE World Con- (56) References Cited

OTHER PUBLICATIONS gress on Computational Intelligence; First IEEE Conference Orlando, Fl. USA Jun. 27-29, 1994; XP010122796; ISBN: 978-0-7803-1899-1, 6 pages.

Vergnano, Alberto et al. "Modeling and Optimization of Energy Consumption in Cooperative Multi-Robot Systems" IEEE Transactions on Automation Science and Engineering, vol. 9. No. 2, Apr. 2012, 6 pages.

Diaz, Nancy et al. "Cost and Energy Consumption Optimization of Product Manufacture in a Flexible Manufacturing System" Laboratory for Manufacturing and Sustainability, University of California at Berkeley, USA, 8 pages.

* cited by examiner

METHOD AND APPARATUS FOR SAVING ENERGY AND REDUCING CYCLE TIME BY OPTIMAL ORDERING OF THE INDUSTRIAL ROBOTIC PATH

CROSS-REFERENCE TO OTHER APPLICATION

This application shares some subject matter with commonly-assigned U.S. patent application Ser. No. 14/448,416 for "Method and Apparatus for Saving Energy and Reducing Cycle Time by Using Optimal Robotic Joint Configurations", which is hereby incorporated by reference.

This application shares some subject matter with commonly-assigned U.S. patent application Ser. No. 14/340,365 for "Energy and Cycle Time Efficiency Based Method for Robot Positioning", which is hereby incorporated by reference.

TECHNICAL FIELD

The present disclosure is directed, in general, to automated industrial operations and robotics, and in particular to methods and systems for determining reduced energy consumption and cycle time by optimal ordering of the industrial robot path.

BACKGROUND OF THE DISCLOSURE

Product data management (PDM) systems manage product lifecycle management (PLM) systems and other data. Improved systems are desirable.

SUMMARY OF THE DISCLOSURE

Various disclosed embodiments include a method for saving energy and reducing cycle time by using optimal ordering of the industrial robotic path. The method includes receiving inputs including one or more of robot information, position information, and a complex operation, generating a plurality of task groups of the complex operation, calculating a group edge rating for each of a plurality of robotic movement edges between each of the plurality of tasks groups, calculating a candidate rating for each of a plurality of candidate paths, wherein the candidate rating comprises a summation of the group edge ratings for a candidate path, determining an optimal path comprising the candidate path with an optimal rating, wherein the optimal rating is determined by the lowest candidate rating, and returning the optimal path.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Computer-aided robotics (CAR) tools are widely used for robotic arm path planning for spot welding. The planned path, generally, contains no more than several dozens of locations spread in its target area, based on part to be welded. The robotic operation should complete all the welds by reaching each one of them from a specific direction in order to avoid the robotic arm or welder colliding with the products or fixture elements.

The order of completing all the welds impacts the manufacturing process time and energy consumption. As the number of welds required by the robotic operation increases, the process of determining the most efficient order of welding becomes more tedious. The chosen path tends to become more arbitrary as the amount of welding location increases, which in turn raise the likelihood that the path chosen is not the most time or energy efficient. For example, when the process has twenty welding locations, 2,432,902,008,176,640,000 different permutations exist.

Consideration of numerous additional constraints makes finding the optimal operation path a complex task. Additional constraints can include whether the robot can reach all locations from a given robot position and whether any collisions occur with the robot and any objects within its environment. A limited cycle time for completing tasks is another constraint that relates to production costs.

Robots can be heavy power consumers. Robots work repeatedly on one or more tasks for long hours and have complex powertrains that can include engines, transmissions, and so on. In a typical production line, there can be many robots, which further amplifies these issues.

Embodiments according to the disclosure find the most efficient or optimal robot operation order based on given constraints and in terms of power consumption and cycle time. The energy to time correlation can include ratings and rankings of the results of simulations that generate power or energy consumption values and cycle time values.

Applying this approach on every robot in a production line reduces the energy consumption and task cycle time resulting in reduced production costs. The reduced production costs come from finding optimal operation order for each robot in the production line to reduce overall energy consumption and cycle time.

Figure 1:
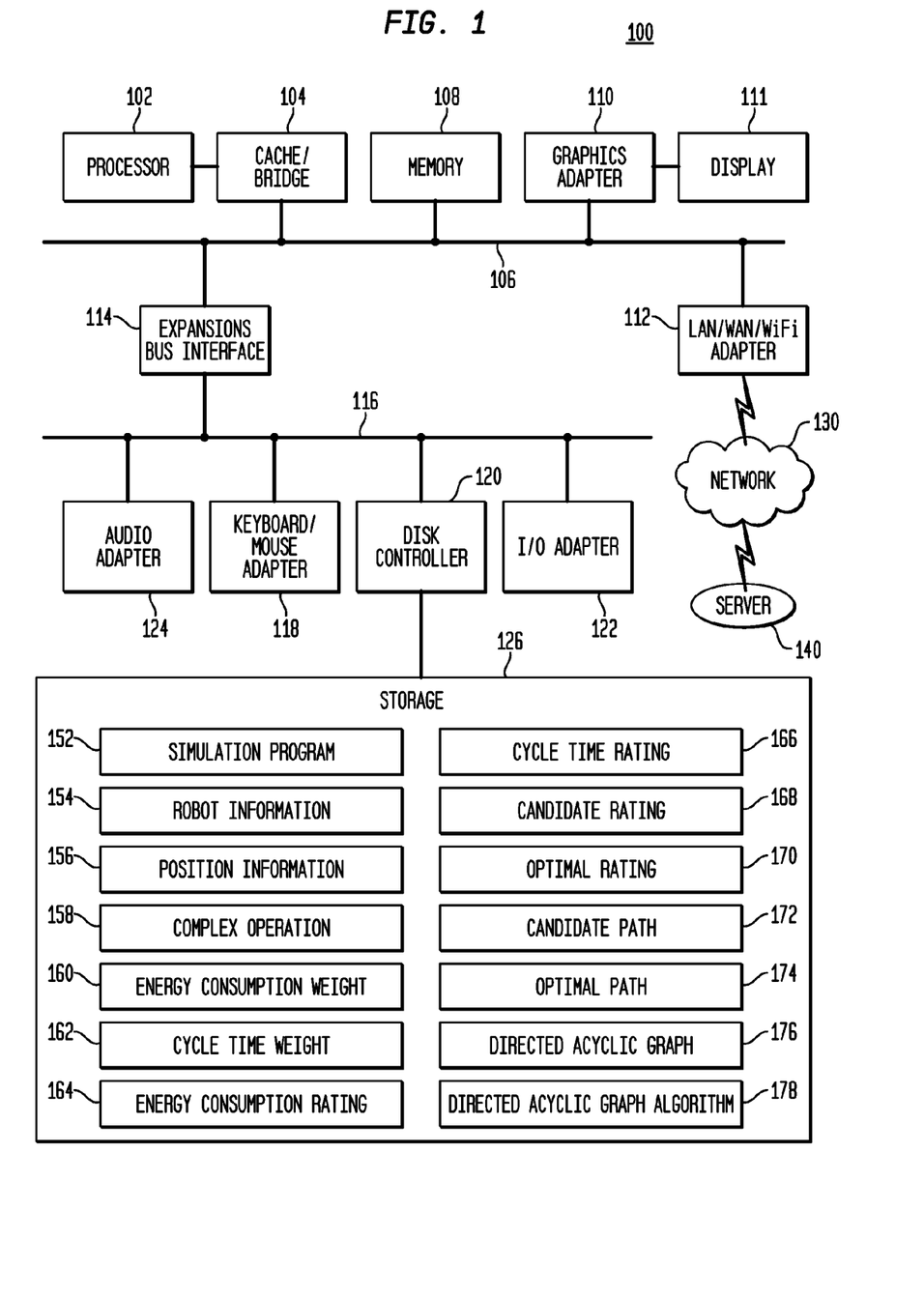
FIG. 1 illustrates a block diagram of a data processing system in which an embodiment can be implemented.

FIG. 1 illustrates a block diagram of a data processing system in which an embodiment can be implemented, for example as a PDM system particularly configured by software or otherwise to perform the processes as described herein, and in particular as each one of a plurality of interconnected and communicating systems as described herein. The data processing system illustrated includes a processor 102 connected to a level two cache/bridge 104, which is connected in turn to a local system bus 106. Local system bus 106 may be, for example, a peripheral component interconnect (PCI) architecture bus. Also connected to a local system bus in the illustrated example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices. The storage 126 stores the simulation program 152, the robot information 154, the position information 156, the complex operation 158, the energy consumption weight 160, the cycle time weight 162, the energy consumption rating 164, the cycle time rating 166, the candidate rating 168, the optimal rating 170, the candidate paths 172, the optimal path 174, the directed acyclic graphs (DAG) algorithm 176, and so on, which are described below.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, touchscreen, etc.

Those of ordinary skill in the art will appreciate that the hardware illustrated in FIG. 1 may vary for particular implementations. For example, other peripheral devices, such as an optical disk drive and the like, also may be used in addition or in place of the hardware illustrated. The illustrated example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100.

Figure 2:
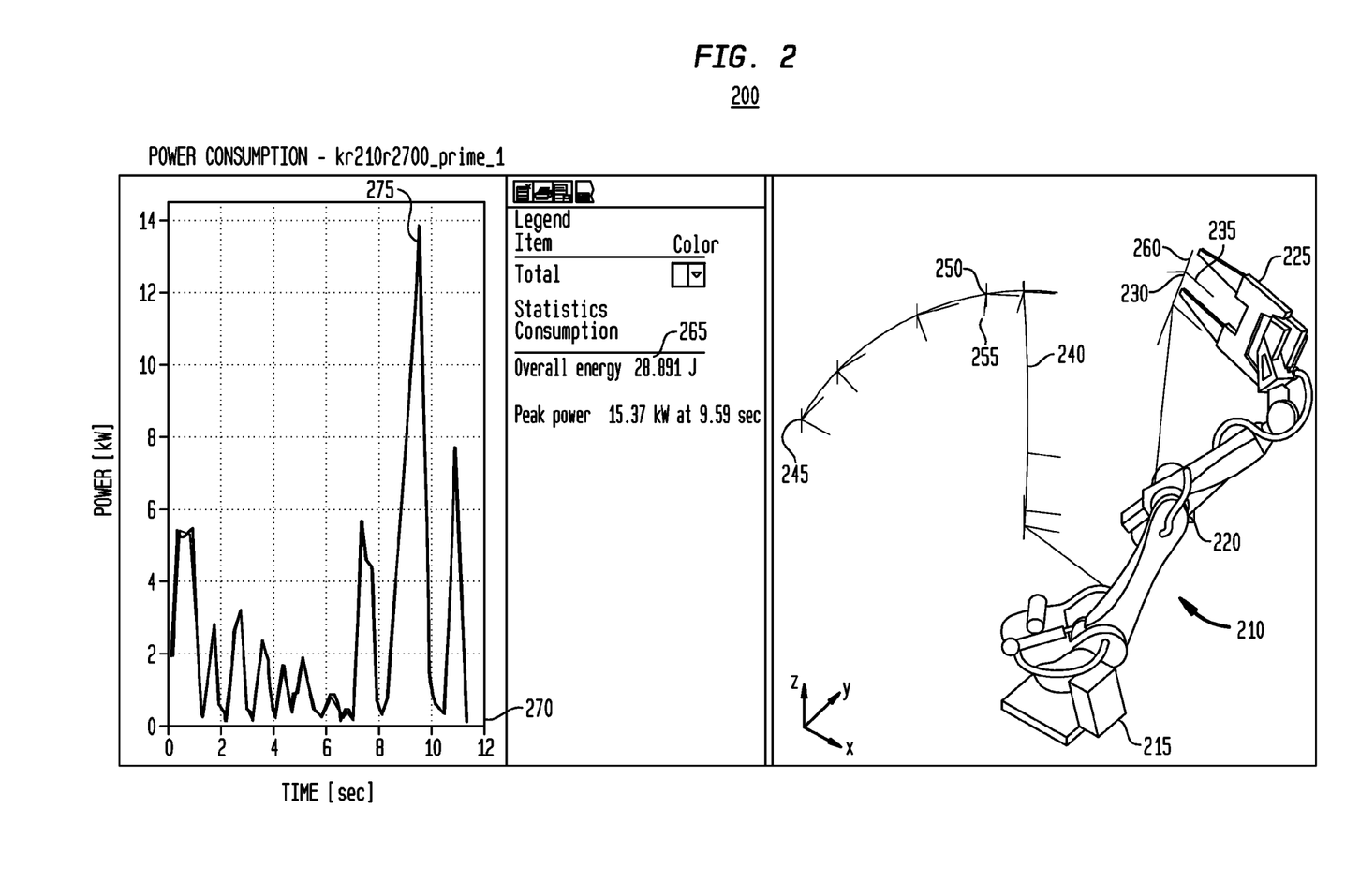
FIG. 2 illustrates a complex operation path for a simulated robot in a three dimensional (3D) complex operation field of a robot simulation in which an embodiment can be implemented.

FIG. 2 illustrates a complex operation path 240 for a simulated robot 210 in a three dimensional (3D) complex operation field of a robot simulation 200 in which an embodiment can be implemented.

The simulated robot 210 represents a simulated model of the robot that allows for simulation of the movements of the robot. The simulated robot 210 is stored in the robot information 154 and is comprised of a base 215, a plurality of joints 220, and an end of arm (EOA) 225. The simulated robot 210 is fixed and positioned in the 3D complex operation field.

The arm of the robot includes a plurality of joints 220 and connects the EOA 225 to the base 215. The simulated robot 210 moves and orients the EOA 225 by rotating at multiple joints 220. In this embodiment, the simulated robot 210 rotates around three joints 220, but the simulated robot 210 can contain any amount of joints 220. The joints 220 used for the simulated robot 210 can any suitable type of joint 220, including but not limited to knuckle joints, turnbuckle joints, pin joints or ball joints.

The EOA 225 is the end of the simulated robot 210 opposite of the base 215. The EOA 225 is an attachment or tooling required for the simulated robot 210 to complete the tasks of the complex operation 158, such as a welder, soldering iron, clamp, or any other suitable attachment or tooling. The EOA 225 includes a simulated robot contact point (SRCP) 230 and a simulated robot point frame (SRPF) 235. The SRCP 230 defines the point at the end of the EOA 225 which a task is performed. The SRPF 235 defines the orientation of the EOA 225 for the completion of tasks in the simulation.

The complex operation 158 is comprised of a series of tasks in which the robot is used to complete. In the robot simulation 200, the complex operation 158 is represented by an initial location 245, a plurality of task locations 250, a final location 260, and a complex operation path 240 connecting all the locations. The task locations 250 representing the complex operation 158 are defined in the complex operation 158.

The complex operation path 240 is defined by the order in which the tasks are to be performed. The complex operation path 240 begins at the initial location 245, continues to a plurality of task locations 250, and ends at the final location 260. The complex operation path 240 represents the optimal path 174 based on distance the EOA 225 follows as the simulated robot 210 moves from one task location 250 to the next. Because the joints 220 on the simulated robot 210 are different sizes and types, the path of the EOA 225 does not necessarily move along the illustrated path.

In certain embodiments, the complex operation 158 requires the EOA 225 to move along the complex operation path 240 starting at the initial location 245 and ending at the final location 260. The initial location 245 and final location 260 are illustrated as different locations, but they could also be the same location. The initial location 245 and final location 260 might also be a task location 250 or could just be a location not interfering with the insertion or removal of the product.

The complex operation 158 requires a plurality of task to be performed. Each task in the complex operation 158 is represented in the robot simulation 200 by a task location 250 and a tool center point frame TCPF 255. The plurality of task locations 250 defines the complex operation path 240 and the location in the 3D complex operation field of the task to be performed. The TCPF 255 defines the required orientation, with a tolerance, in which the EOA 225 must suitably match at a particular task location 250 to complete the task. In order for an EOA 225 to complete a task for the simulation, the simulated robot 210 must extend the EOA 225 so that the SRCP 230 reaches the task location 250 and the SRPF 235 must match within the tolerance of the TCPF 255 for the task location 250.

The simulation program 152 calculates the energy consumption 265 and cycle time 270 for robotic movement 275 of the simulated robot 210. The energy consumption 265 is the amount of energy consumed by the robot determined by the robotic simulation 200. The cycle time 270 is the amount of time the robot takes to complete a cycle determined by the robotic simulation 200. In this embodiment, the energy consumption 265 and cycle time 270 are determined between each task location 250.

Figure 3:
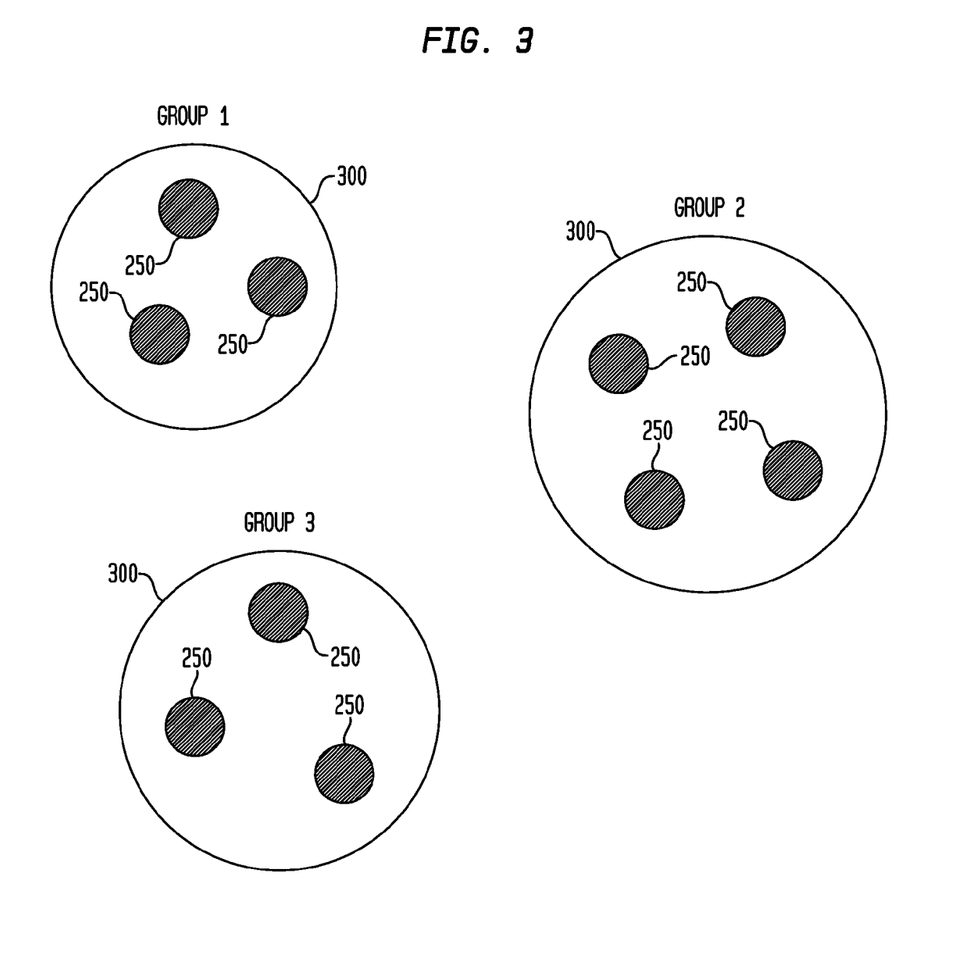
FIG. 3 illustrates a plurality of task locations grouped into a plurality of task groups in accordance with the disclosed embodiments.

FIG. 3 illustrates a plurality of task locations 250 grouped into a plurality of task groups 300 in accordance with the disclosed embodiments. Grouping the task locations 250 allows for a more efficient ordering of tasks greatly reducing the amount of permutations of candidate paths 172. The task locations are grouped by proximity, by definition created by a user, or any other suitable method of grouping task locations.

Figure 4:
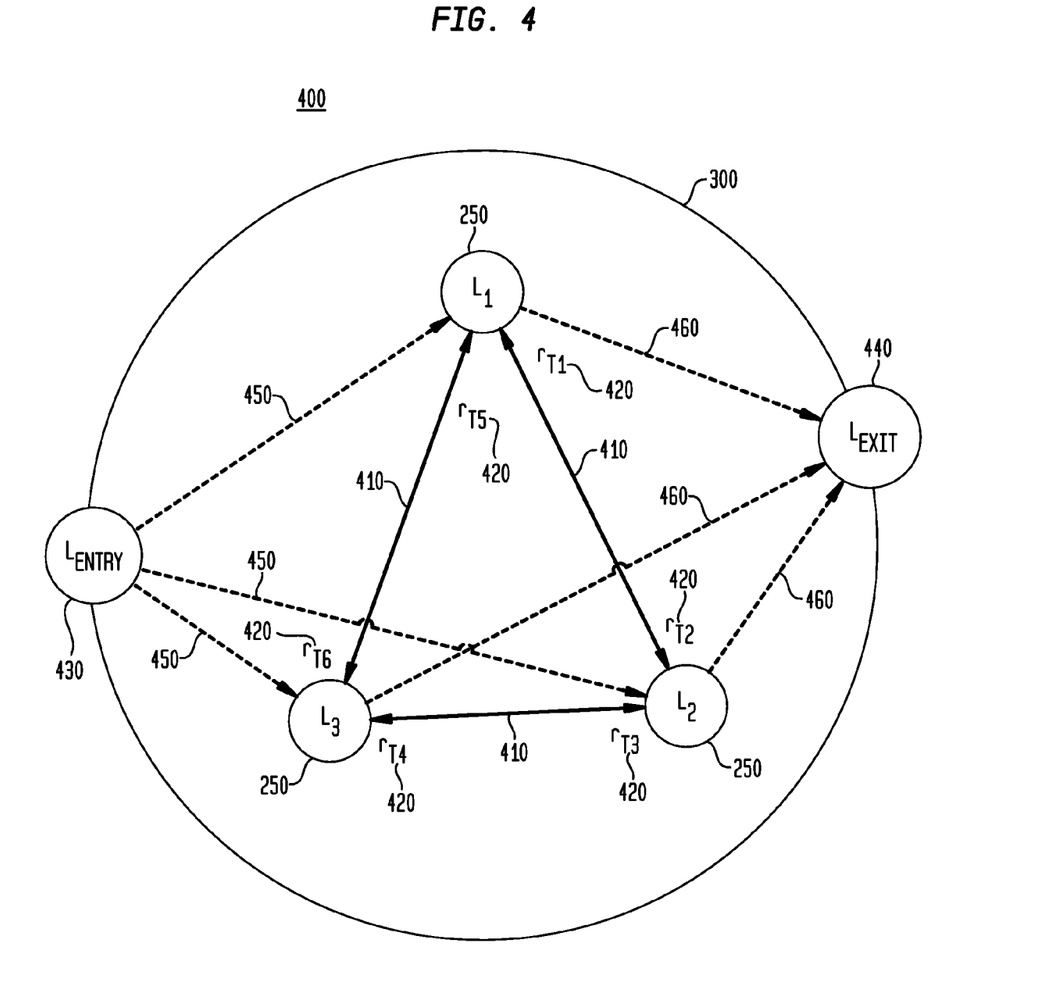
FIG. 4 illustrates a directed acyclic graph (DAG) of a task group comprising task edge ratings for robotic movement edges between task locations in accordance with the disclosed embodiments.

FIG. 4 illustrates a task group DAG 400 of a task group 300 comprising task edge ratings 420 for robotic movement edges 410 between task locations 250 in accordance with the disclosed embodiments. The task group 300 comprises a plurality of task locations 250, a plurality of robotic movement edges 410 connecting the plurality of task locations 250, a task edge rating 420 for each robotic movement edge 410, a task group entry location 430, a plurality of task group entry edges 450 connecting the task group entry location 430 to each of the task locations 250 in the task group 300, a task group exit location 440 and a plurality of task group exit edges 450 connecting each of the task location 250 in the task group 300 to the task group exit location 440.

Between every task location 250 inside the task group 300, all possible robotic movement edges 410 are generated connecting each task location 250 to all the other task locations 250. The robotic movement edges' 410 weight values connecting the different task locations 250 illustrate the rating of the simulated robot 210 to move between task locations 250. Because the robotic movement edges 410 are representing robotic movement 275, the task edge rating 420 is different for the robotic movement 275 in each direction due to forces such as gravity.

The task group entry location 430 is the location where the task group DAG 400 begins for each task group 300. The task group entry location 430 and the task group exit location 440 are located on the outer fringe of the task group 300. The task group entry location 430 represents the location where the simulated robot 210 enters the task group 300. The task group exit location 440 represents the location where the simulated robot 210 exits the task group 300. A task group entry edge 450 connects the task group entry location 430 with each of the task locations 250 in the task group 300. The task group exit location 440 is the location where the task group DAG 400 ends for each task group 300. A task group exit edge 460 connects the task group exit location 440 with each of the task locations 250 in the task group 300.

In this embodiment, the task group entry location 430 and the task group exit location 440 are not actually real task locations 250, but dummy locations, so the task group DAG 400 will be closed and will able to be resolved by DAG algorithms 176. Since it is a dummy location, it has no robotic movement 275 and therefore the task group entry edges 450 and the task group exit edges 460 contain a '0' rating. When the task group entry location 430 and the task group exit location 440 are dummy locations, the location on the fringe of the task group 300 is irrelevant, as long as the location is on the fringe.

With all the task locations 250 designated, the simulation program 152 calculates energy consumption 265 and cycle time 270 for all the robotic movement edges 410 required for the robotic motion 275 between all task locations 250 of the complex operation 158.

The cycle time 270 and the energy consumption 265 can be calculated from an realistic robot simulation (RRS) for all possible robotic movements 275 between task locations 250. The robot simulation 200 simulates the robot performing the complex operation 158 and the robot simulation 200 provides the cycle time 270 and the energy consumption 265 of the robotic movement edge 410.

The system determines the energy consumption weight (EW) 160 and the cycle time weight (TW) 162. Each of the EW 160 and the TW 162 can be constant or based on a combination of values including the cycle time 270 and the energy consumption 265 via a formula. In this embodiment, the EW 160 formula ($f_{EW}$) defines the weight the energy consumption 265 has on the ratings and the TW 162 formula ($f_{TW}$) defines the weight the cycle time 270 has on the ratings.

The system determines an energy consumption rating (ER) 164 and a cycle time rating (TR) 166 based on the EW 160, the TW 162, the cycle time 270, and the energy consumption 265. In certain embodiments, the ER 164 and the TR 166 can be determined via equations (1) and (2), respectively:

$$ER = \frac{f_{EW}}{f_{EW} + f_{TW}} \quad (1)$$

$$TR = \frac{f_{TW}}{f_{EW} + f_{TW}} \quad (2)$$

The system determines a comprehensive edge rating ($r_i$) based on one or more of the ER 164, the TR 166, the EW 160, the TW 162, the cycle time 270, and the energy consumption 265. In certain embodiments, the task edge ratings 420 and the group edge ratings 520 ($r_i$) are determined via equation (3):

$$r_i = \frac{W_i \cdot ER}{\sum_{i=0}^{n} W_i} + \frac{t_i \cdot TR}{\sum_{i=0}^{n} t_i} \quad (3)$$

where $r_i$ is the normalized edge rating of the robotic movement edge 410 ($i$), $W_i$ is the energy consumption 265 for the robotic movement edge 410 ($i$), and $t_i$ is cycle time 270 for the robotic movement edge 410 ($i$). In this embodiment, the edge ratings inside the task groups 300 are designated as task edge ratings 420 and the edge ratings between the task groups 300 are designated as group edge ratings 520 (illustrated in FIG. 5).

where (n) is the number of robotic movement edges 410 and:

$$R = \sum_{i=0}^{n} r_i = 1 \quad (5)$$

so that the sum of all normalized rankings ($r_i$) is equal to 1 and the normalized ranking of each robotic movement edge 410 is based on the summation of the edge ratings for all the robotic movement edges 410.

Based on the energy consumption 265 ($W_i$), the cycle time 270 ($t_i$), the ER 164, the TR 166, the $r_i$, the DAG algorithm 176 provides the optimal path 174 having the lowest value of all the $r_i$ values.

Figure 5A:
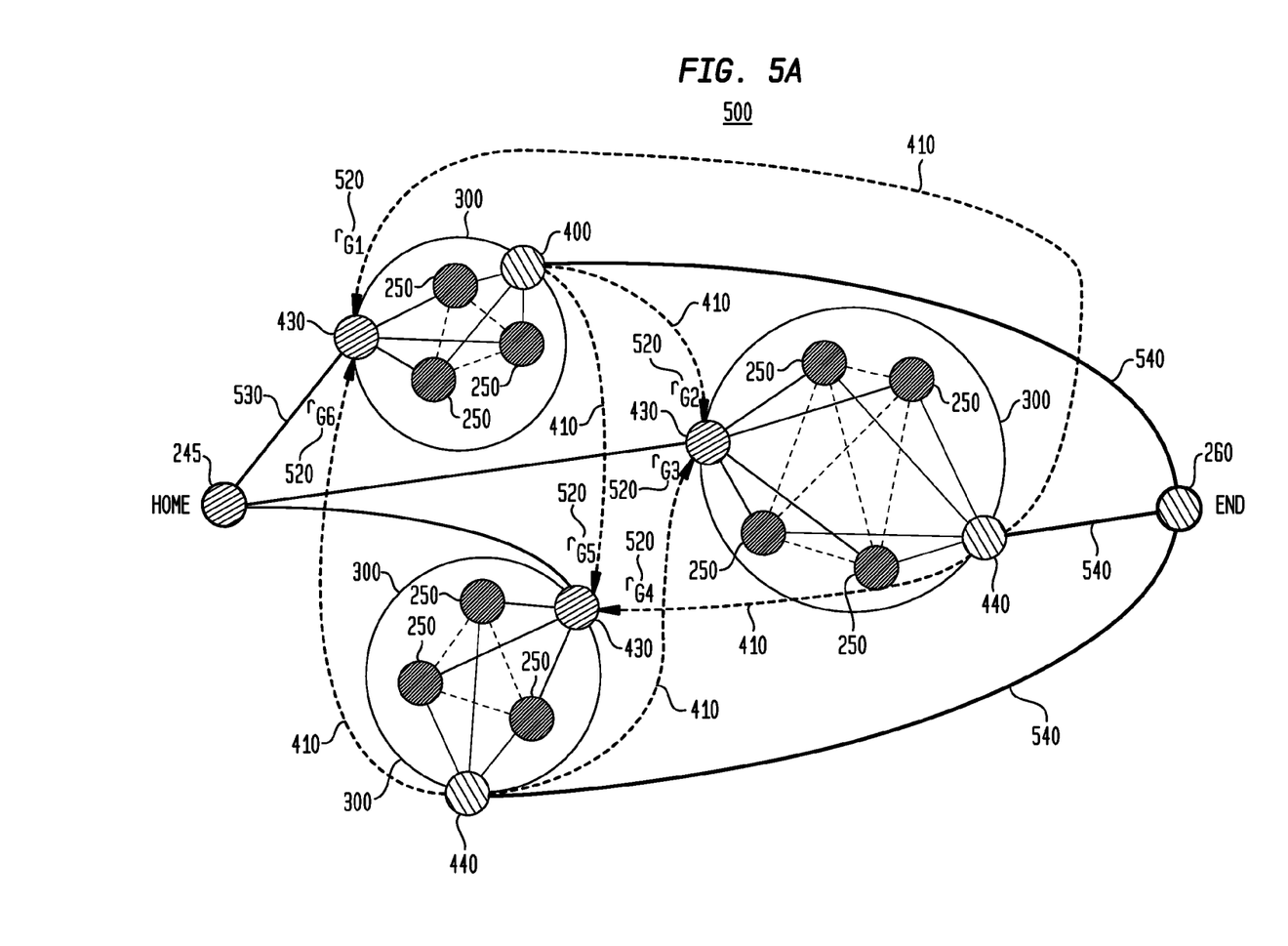
FIGS. 5A and 5B illustrate DAGs of different group edge ratings for robotic movement edges between task groups for completing a complex operation in accordance with the disclosed embodiments.
Figure 5B:
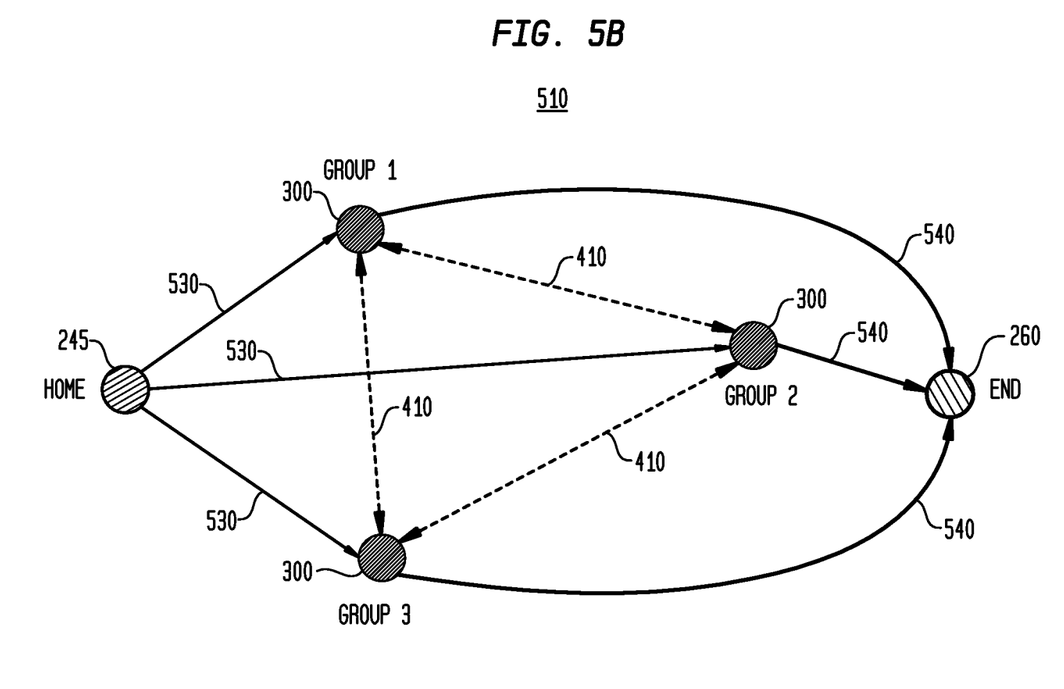

FIGS. 5A and 5B illustrate DAGs of different group edge ratings 520 for robotic movement edges 410 between task groups 300 for completing a complex operation in accordance with the disclosed embodiments.

FIG. 5A illustrates an operation DAG 500 comprising an initial location 245, a plurality of initial edges 530 connecting the initial location 245 to each of the plurality of task groups 300, a final location 260, a plurality of final edges 540 connecting the plurality of task groups 300 to the final location 260, a plurality of robotic movements edges 410 connecting the plurality of task groups 300, and a plurality of task groups 300 each containing a plurality of task locations 250, a plurality of robotic movement edges 410 connecting the plurality of task locations 250, a task edge rating 420 for each robotic movement edge 410, an task group entry location 430 and a task group exit location 440. While FIG. 5A illustrates all the task locations 250 inside task groups 300, a single task location 250 may be outside of all the task groups 300. In these situations, the single task location 250 is included in the operation DAG 500 and connected to the task groups 300 with robotic movement edges 410.

Between every task group 300, all possible robotic movement edges 410 are generated connecting each task group 300 to all the other task groups 300. The robotic movement edges' 410 weight values connecting the task groups 300 illustrate the rating of the simulated robot 210 to move between task groups 300. Because the robotic movement edges 410 are representing robotic movement 275, the group edge rating 520 is different for the robotic movement 275 in each direction due to forces such as gravity.

The initial location 245 is the location where the operation DAG 500 begins. A plurality of initial edges 530 connects the initial location 245 with each of the task group 300. The final location 260 is the location where the operation DAG 500 ends. A plurality of final edges 540 connects the final location 260 with each of the task group 300.

In this embodiment, the initial location 245 and the final location 260 are not actually real task locations 250, but dummy locations, so the operation DAG 500 will be closed and will able to be resolved by DAG algorithms 176. Since it is a dummy location, it has no robotic movement 275 and therefore the initial edges 530 and the final edges 540 contain a '0' rating.

FIG. 5B illustrates a simplified DAG 510 comprising a plurality of task groups 300, an initial location 245, a plurality of initial edges 530 connecting the initial location to each of the plurality of task groups 300, a final location 260, a plurality of final edges 540 connecting the plurality of task groups 300 to the final location 260, and a plurality of robotic movements edges 410 connecting the plurality of task groups 300.

In certain embodiments, the differences in the summation of task edge ratings 420 for the different candidate paths 172 inside a task group 300 are negligent in comparison with the differences in summation of group edge ratings 520 for the different candidate paths 172 that a simplified DAG 510 is used for determining the optimal path 174. In other embodiments, the simplified DAG 510 determines the optimal path is used to reduce the processing time to solve the DAG algorithm 176, decrease the complexity of the model, or any other suitable reason.

Figure 6A:
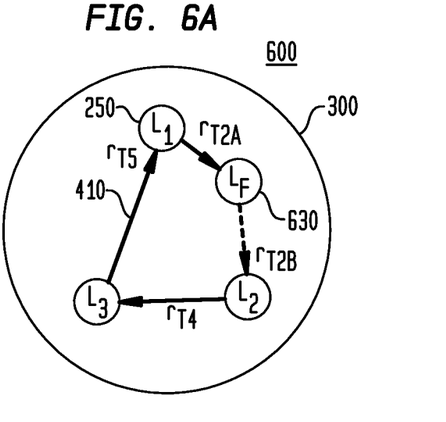
FIGS. 6A-6C illustrate different alternatives when a collision event for a robotic movement is discovered in accordance with the disclosed embodiments.
Figure 6B:
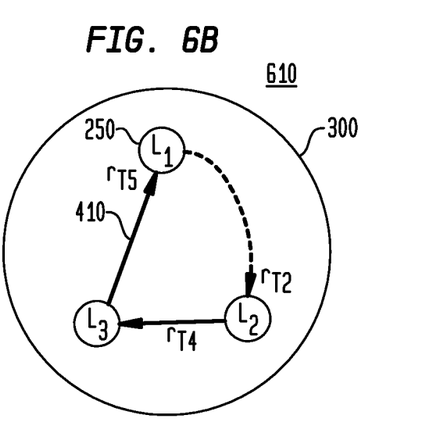
Figure 6C:
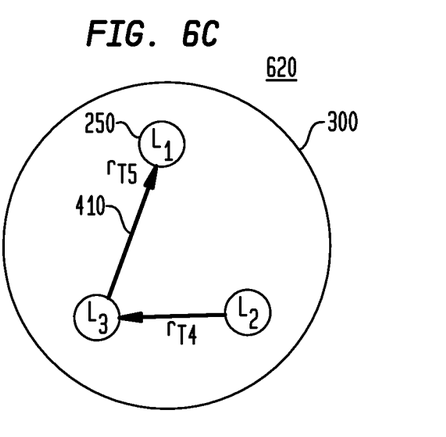

FIGS. 6A-6C illustrate different alternatives when a collision event for a robotic movement 275 is discovered in accordance with the disclosed embodiments. While the different alternatives are illustrated for robotic movements 275 between task locations 250 inside a task group 300, the alternatives are also implemented on the robotic movements 275 between task groups 300 when collisions events are detected.

FIG. 6A illustrates the use of a flyby path 600 to remove the collision event from the robotic movement 275. The robotic movement 275 can be altered by adding one or more flyby locations 630 or additional non-task locations. Flyby locations 630 are described, for example, in U.S. Patent Publication 2011/0153080 A1, which is hereby incorporated by reference. When adding flyby locations 630, the candidate path 172 is changed (a new fly-by location 630 is added) and the weights of robotic movement edges 410 for this specific candidate path 172 should be recalculated. Note that adding a flyby location 630 for a candidate path 172, where a collision is detected, does not necessarily add that flyby location 630 to other candidate paths 172, whether or not a collision is detected. Candidate paths 172 could contain unique flyby locations 630 between task locations 250 when a collision is detected. Different flyby locations 630 can be added for different candidate paths 172 between similar consecutive task locations 250. The robotic movement edges 410 where the collision is detected will be split connecting the previously connect task locations 250 to the flyby location 630.

FIG. 6B illustrates the use of an alternative path 610 to remove the collision event from the robotic movement 275. The system removes the collision event by altering the robotic movement 275 between the consecutive task locations 250 when a collision event is detected.

FIG. 6C illustrates the use of a removed path 620 to remove the collision event from the robotic movement 275. In certain embodiments, the collision event is removed by the system by removing the robotic movement edges 410 which contain the collision event.

Figure 7:
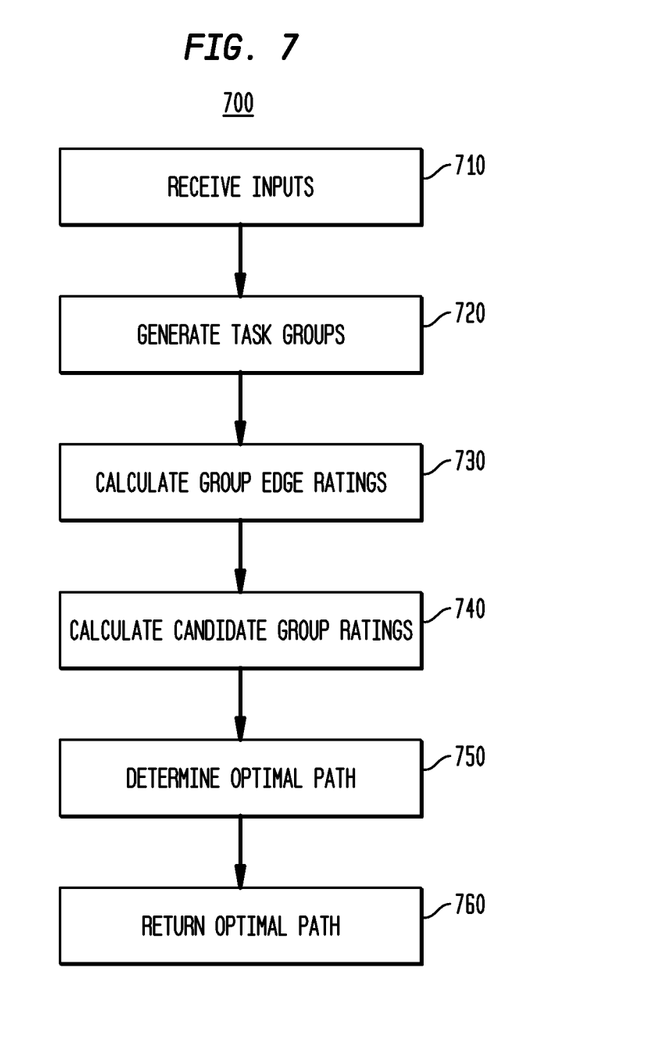
FIG. 7 illustrates flowchart of a process for saving energy and reducing cycle time by using optimal ordering of the industrial robotic path in accordance with disclosed embodiments.

FIG. 7 illustrates a flowchart 700 of a process for saving energy and reducing cycle time by using optimal ordering of the industrial robotic path in accordance with disclosed embodiments that may be performed, for example, by a PLM or PDM system. The energy consumption 265 of the robot is realistic and accurate based on a RRS performed by a data processing system 100, such as the data processing system 100 of FIG. 1. The RRS interface is known to those of skill in the art, and is described at time of filing, for example, at realistic-robot-simulation.org. The system uses RRS simulation to accumulate the energy consumption 265 for each one of the candidate paths 172 and to find the collisions within the robot simulation 200.

In step 710, the system receives inputs including one or more of robot information 154, and position information 156, and the complex operation 158. The robot information 154 can include a model of the robot that allows for simulation of the movements of the robot. The robot information 154 also can include information related to the geometry or environment of the robot, the robot's surroundings, and any objects pertinent to the placement or location of the robot. The complex operation 158 can include information on the complex operation 158 that the robot is to perform, the initial position, a set of task locations 250 for the robot to reach to perform the complex operation 158, TCPF 255, and any other operation related information. The position information 156 contains the robot's position. One or more of the processor 102, the memory 108, and the simulation program 152 running on the processor 102 receive the inputs via one or more of the local system bus 106, the adapter 112, the network 130, the server 140, the interface 114, the I/O bus 116, the disk controller 120, the storage 126, and so on. Receiving, as used herein, can include retrieving from storage 126, receiving from another device or process, receiving via an interaction with a user, or otherwise.

In step 720, the system generates a plurality of task groups 300 for a complex operation 158 based on the inputs. In some embodiments, the system generates a plurality of task locations 250 in each of the plurality of task groups 300. The TCPF 255 information, including desired task orientation, the task orientation tolerance, and any other information required for reaching the task location 250, is added to the 3D complex operation field. The system generates a task location 250 in the 3D complex operation field for each of the one or more tasks required for completion of the complex operation 158. Because the task group 300 is not a task location 250, only the SRCP 230 needs to locate the task group 300.

While running the simulation for each candidate path 172, the system also determines if the simulation includes a collision and adjusts the candidate path 172 to remove one or more collision events. If the system cannot adjust the robotic movement 275 to remove the one or more collision events, the system removes the robotic movement edge 410 from the DAG that contain collision events between consecutive task locations 250. If a collision event is detected at a task location 250, then the system removes the candidate paths 172 that contain the task locations 250 determined to contain a collision event. In certain embodiments, the collision is removed by the system altering the robotic movement 275 between the consecutive task locations 250 when a collision event is detected. The robotic movement 275 can be altered by adding one or more flyby locations 630 or additional non-task locations, changing the TCPF 255 of the task location 250, changing the configuration of the robot, and so on.

When adding flyby locations 630, the candidate path 172 is changed (a new fly-by location 630 is added) and the weights of edges for this specific candidate path 172 should be recalculated. Note that adding a flyby location 630 for a candidate path 172, where a collision is detected, does not necessarily add that flyby location 630 to other candidate paths 172, whether or not a collision is detected. Candidate paths 172 could contain unique flyby locations 630 between task locations 250 when a collision is detected. Different flyby locations 630 can be added for different candidate paths 172 between similar consecutive task locations 250.

In step 730, the system calculates the group edge ratings 520 for each of a plurality of robotic movement edges 410 between each of the plurality of task groups 300. Where a robotic movement edge 410 accounts for the robotic movement 275 between consecutive task groups 300. In some embodiments, the system calculates a task edge rating 420 for each of the plurality of robotic movement edges 410 between each task location 250 inside each of the plurality of task groups 300. Where a robotic movement edge 410 also accounts for the robotic movement 275 between consecutive task locations 250.

In certain embodiments, the system calculates the energy consumption 265 and the cycle time 270 for the robotic movements 275 for each of the candidate paths 172. The energy consumption calculation includes the energy the robot consumes to move to the task locations 250 for the complex operation 158. The energy consumption 265 calculates the amount of energy consumed by the robot in order to complete the complex operation 158 for which the simulation was run. For realistic energy values, the robot simulation 200 can include pauses at task location 250 to incorporate energy calculations for a task to be completed, such as welding. In certain embodiments, for each candidate path 172 remaining, when the energy consumption 265 does not meet a threshold, the system removes the candidate path 172. The cycle time 270 is calculated as the time it takes to complete the robotic movement 275 and when the cycle time 270 does not meet the threshold, the system removes the candidate paths 172 which contain the robotic movement 275.

In step 740, the system calculates a candidate rating 168 for each of a plurality of candidate paths 172. Where a candidate rating 168 comprises a summation of group edge ratings 520 of robotic movements 275 for a candidate path 172. In some embodiments, the candidate rating 168 further comprises a summation of the task edge ratings 420 for the candidate path 172.

In step 750, the system determines the optimal path 174 based on the candidate path 172 with an optimal rating 170. Where the optimal rating 170 is determined based on the lowest candidate rating 168.

In step 760, the system returns the optimal path 174 based on the candidate path 172 with an optimal rating 170 between the energy consumption 265 and the cycle time 270. In certain embodiments, the optimal rating 170 is determined as a correlation between the energy consumption 265 and the cycle time 270 and is determined based on the lowest weight of the candidate paths 172.

Of course, those of skill in the art will recognize that, unless specifically indicated or required by the sequence of operations, certain steps in the processes described above may be omitted, performed concurrently or sequentially, or performed in a different order.

Those skilled in the art will recognize that, for simplicity and clarity, the full structure and operation of all data processing systems suitable for use with the present disclosure is not being illustrated or described herein. Instead, only so much of a data processing system as is unique to the present disclosure or necessary for an understanding of the present disclosure is illustrated and described. The remainder of the construction and operation of data processing system may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke 35 USC §112(f) unless the exact words "means for" are followed by a participle.

What is claimed is:

1. A method for saving energy and reducing cycle time by using optimal ordering of an industrial robotic path, the method performed by a data processing system and comprising:
receiving inputs including a complex operation;
generating a plurality of task groups of the complex operation based on the inputs, wherein an area of each task group comprises a fringe not defined by a task location;
calculating a group edge rating for each of a plurality of robotic movement edges between each of the plurality of task groups;
calculating a candidate rating for each of a plurality of candidate paths, wherein the candidate rating comprises a summation of the group edge ratings for a candidate path;
determining an optimal path comprising the candidate path with an optimal rating, wherein the optimal rating is determined by the lowest candidate rating; and
operating a robot using the optimal path.

2. The method of claim 1, further comprising:
generating a plurality of task locations in each of the plurality of task groups;
calculating a task edge rating for each of the plurality of robotic movement edges between each of the plurality of task locations inside each of the plurality of task groups; and
wherein the candidate rating further comprises a summation of the task edge ratings for the candidate path.

3. The method of claim 1, wherein determining an optimal path comprises using a directed acyclic graph algorithm.

4. The method of claim 1, further comprising:
simulating the plurality of robotic movements to determine an energy consumption and a cycle time for each of the plurality of robotic movement edges.

5. The method of claim 4, further comprising:
for each of the plurality of robotic movement edges, determining an energy consumption weight and a cycle time weight based on the cycle time and the energy consumption of the robotic movement edge.

6. The method of claim 5, further comprising:
for each of the plurality of robotic movement edges, determining an energy consumption rating and a cycle time rating based on the energy consumption weight, the cycle time weight, the cycle time, and the energy consumption of the robotic movement edge.

7. The method of claim 6, further comprising:
for each of the plurality of robotic movement edges, determining the candidate rating based on one or more of the energy consumption rating, the cycle time rating, the energy consumption weight, the cycle time weight, the cycle time, and energy consumption of the robotic movement edge.

8. A data processing system comprising:
a processor; and
an accessible memory, the data processing system particularly configured to:
receive inputs including a complex operation;
generate a plurality of task groups of the complex operation based on the inputs, wherein an area of each task group comprises a fringe not defined by a task location;
calculate a group edge rating for each of a plurality of robotic movement edges between each of the plurality of task groups;
calculate a candidate rating for each of a plurality of candidate paths, wherein the candidate rating comprises a summation of group edge ratings for a candidate path;

determine an optimal path comprising the candidate path with an optimal rating, wherein the optimal rating is determined by the lowest candidate rating; and operate a robot using the optimal path.

9. The data processing system of claim 8, further comprising:

generate a plurality of task locations in each of the plurality of task groups;

calculate a task edge rating for each of the plurality robotic movement edges between each of the plurality of task locations inside each of the plurality of task groups; and wherein the candidate rating further comprises a summation of the task edge ratings for the candidate path.

10. The data processing system of claim 8, wherein to determine an optimal path comprises using a directed acyclic graph algorithm.

11. The data processing system of claim 8, further comprising:

simulate the plurality of robotic movements to determine an energy consumption and a cycle time for each of the plurality of robotic movement edges.

12. The data processing system of claim 11, further comprising:

for each of the plurality of robotic movement edges, determine an energy consumption weight and a cycle time weight based on the cycle time and the energy consumption of the robotic movement edge.

13. The data processing system of claim 12, further comprising:

for each of the plurality of robotic movement edges, determine an energy consumption rating and a cycle time rating based on the energy consumption weight, the cycle time weight, the cycle time, and the energy consumption of the robotic movement edge.

14. The data processing system of claim 13, further comprising:

for each of the plurality of robotic movement edges, determine the candidate rating based on one or more of the energy consumption rating, the cycle time rating, the energy consumption weight, the cycle time weight, the cycle time, and energy consumption of the robotic movement edge.

15. A non-transitory computer-readable medium encoded with executable instructions that, when executed, cause one or more data processing systems to:

receive inputs including a complex operation;

generate a plurality of task groups of the complex operation based on the inputs, wherein an area of each task group comprises a fringe not defined by a task location;

calculate a group edge rating for each of a plurality of robotic movement edges between each of the plurality of task groups;

calculate a candidate rating for each of a plurality of candidate paths, wherein the candidate rating comprises a summation of group edge ratings for a candidate path;

determine an optimal path comprising the candidate path with an optimal rating, wherein the optimal rating is determined by the lowest candidate rating; and operate a robot using the optimal path.

16. The computer-readable medium of claim 15, further comprising:

generate a plurality of task locations in each of the plurality of task groups;

calculate a task edge rating for each of the plurality of robotic movement edges between each of the plurality of task locations inside each of the plurality of task groups; and wherein the candidate rating further comprises a summation of the task edge ratings for the candidate path.

17. The computer-readable medium of claim 15, wherein to determine an optimal path comprises using a directed acyclic graph algorithm.

18. The computer-readable medium of claim 15, further comprising:

simulate the plurality of robotic movements to determine an energy consumption and a cycle time for each of the plurality of robotic movement edges.

19. The computer-readable medium of claim 18, further comprising:

for each of the plurality of robotic movement edges, determine an energy consumption weight and a cycle time weight based on the cycle time and the energy consumption of the robotic movement edge.

20. The computer-readable medium of claim 19, further comprising:

for each of the plurality of robotic movement edges, determine an energy consumption rating and a cycle time rating based on the energy consumption weight, the cycle time weight, the cycle time, and the energy consumption of the robotic movement edge.

* * * * *